Figure 1:
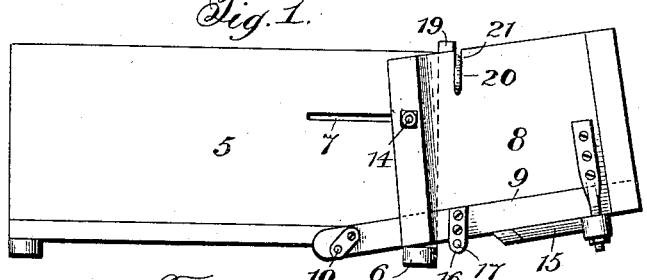

No. 862,637.

PATENTED AUG. 6, 1907.

J. H. HOUSWORTH.
WAGON.
APPLICATION FILED OCT. 16, 1906.

Witnesses:
Jas. E. Hutchinson
N. Smith

Inventor:
Joseph H. Housworth,
By John W. Norris & Co., Attorneys.

UNITED STATES PATENT OFFICE.

JOSEPH H. HOUSWORTH, OF GILMER, TEXAS.

WAGON.

No. 862,637.  Specification of Letters Patent.  Patented Aug. 6, 1907.

Application filed October 16, 1906. Serial No. 339,273.

*To all whom it may concern:*

Be it known that I, JOSEPH H. HOUSWORTH, a citizen of the United States, residing at Gilmer, in the county of Upshur and State of Texas, have invented new and useful Improvements in Wagons, of which the following is a specification.

This invention provides an end-gate for wagons and other vehicles, which is arranged to facilitate the unloading of grain, cotton-seed, and other bulk material, which is handled with a scoop or similar implement.

Means are also provided by the invention whereby bulk material may be directed from a vehicle-body immediately into a bin or other place, without the waste which is common at the removal or opening of an ordinary end-gate.

The invention also contemplates an end-gate arrangement which will serve as a feed-box for the draft-animals.

When read in connection with the following description, the details of construction and arrangement of parts contemplated by this invention will be apparent from the accompanying drawings, forming part hereof, wherein a preferable embodiment of the invention is disclosed, for purposes of illustration.

Like reference characters refer to corresponding parts in the several views of the drawings, whereof—

Figure 2:
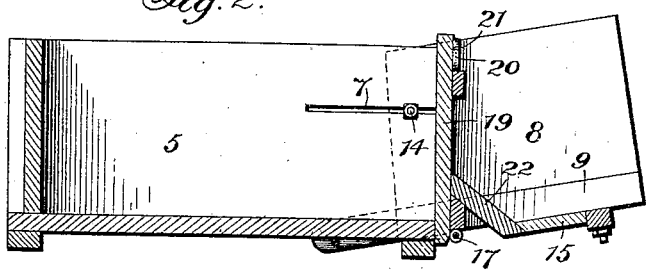
Figure 3:
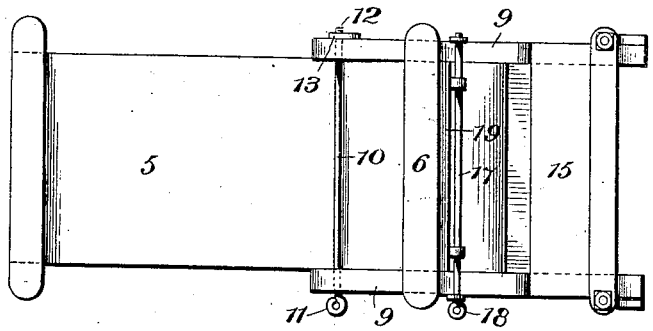
Figure 4:
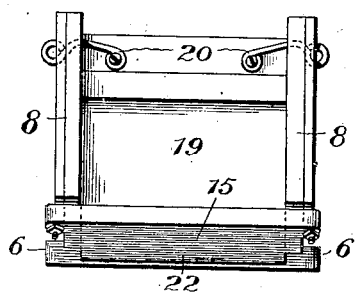

Figure 1 is a side view of a wagon-body having my improved end-gate and supplementary body attached thereto; Fig. 2 is a longitudinal sectional view thereof; Fig. 3 is a bottom view; and Fig. 4 is an end view.

Having more particular reference to the drawings, 5 indicates a wagon-body, having a cross-piece 6 attached to the end of the bottom and projecting beyond the sides, and having its sides formed at their rear ends with longitudinal slots 7. A supplemental body is attached to the rear end of the wagon-body 5, the supplemental body comprising sides 8, supported on members 9. Members 9 project forward of sides 8, outside of the wagon-body, over the ends of cross-piece 6, and are connected by a bolt-rod 10, which passes under and engages the under part of the wagon-body, whereby the supplemental frame or body is supported in a position slanting rearwardly upward. Rod 10 is headed on one end, as shown at 11, and is screw-threaded on the other end 12, where it passes through a screw-threaded aperture in a clamp 13 attached to one of members 9.

Passed through sides 8 are bolts 14, which are arranged for movement in slots 7 when loosened, and which when tightened hold the supplemental body in position. By means of adjustment of these bolts along the slots 7, either forwardly or rearwardly, the supplemental body can be tilted, as desired.

Attached to members 9 at their rear is a partial bottom 15, a space being left between the end of the wagon-body and this bottom.

Depending from members 9, on each side of the supplemental body, and intermediate the end of the wagon-body and partial bottom 15, are apertured hangers 16, one of which is screw-threaded. These hangers are arranged to receive and hold a bolt-rod 17, the screw-threaded end of which passes through the apertured screw-threaded hanger 16, and the other end of which is headed, as at 18, and engages the other hanger.

Pivoted on bolt-rod 17 is an end-gate 19, having pivoted catches 20 at or near its top, which are engageable with slots 21 in sides 8 for the purpose of securing the end-gate in upright position. End-gate 19 has attached thereto, intermediate its top and bottom, a downwardly and rearwardly slanting member 22, which, when the end-gate is in upright position, fills in the space between it and the partial bottom 15. By end-gate 19, member 22, partial bottom 15, and sides 8, a convenient feed-box is formed. When the end-gate is swung backwardly and downwardly, member 22 will also swing downwardly, discharging cobs and other remains of food of the draft-animals, and the end-gate will rest on partial bottom 15. In this position, the supplemental body forms a chute which facilitates the unloading of the contents of the wagon.

Having thus described my invention, what I claim as new, and desire to secure by Letters Patent, is—

1. A supplemental body for wagons comprising sides, a partial bottom at the rear thereof, an end-gate forward, and a member attached to the end-gate and filling the space between the partial bottom and the end-gate, for the purpose described.

2. In combination with a wagon-body having a laterally-projecting cross-piece at its rear, a supplemental body therefor comprising forwardly-projecting supporting-members resting on said cross-piece, and a member connecting said supporting members near their forward ends and extending beneath the wagon-body, whereby the supplemental body is supported.

In testimony whereof, I affix my signature in the presence of two witnesses.

JOSEPH H. HOUSWORTH.

Witnesses:
 S. C. HART,
 W. L. WILLEFORD.